No. 853,559. PATENTED MAY 14, 1907.
P. A. MAIGNEN & T. I. CRANE.
METHOD OF DESICCATING AIR.
APPLICATION FILED JULY 9, 1906.
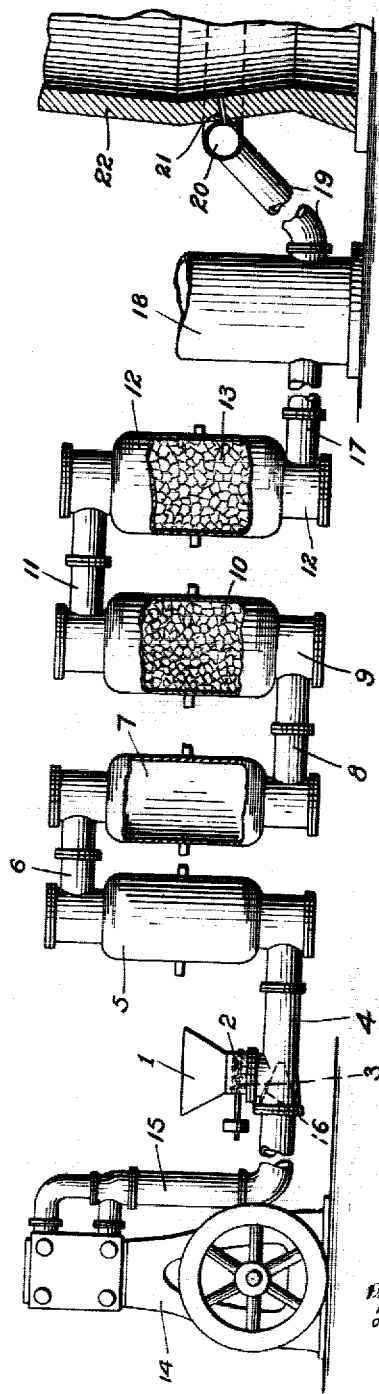
WITNESSES:
Louis N. Buck.
Jas. G. Denny, Jr.
INVENTORS
Prosper Auguste Maignen
Theron I. Crane
BY
Charles N. Butler
ATTORNEY

UNITED STATES PATENT OFFICE.

PROSPER AUGUSTE MAIGNEN AND THERON I. CRANE, OF PHILADELPHIA, PENNSYLVANIA.

METHOD OF DESICCATING AIR.

No. 853,559.　　　Specification of Letters Patent.　　　Patented May 14, 1907.

Application filed July 9, 1906. Serial No. 325,429.

*To all whom it may concern:*

Be it known that we, PROSPER AUGUSTE MAIGNEN and THERON I. CRANE, residents of Philadelphia, in the county of Philadelphia and State of Pennsylvania, have invented a new and useful Method of Desiccating Air, of which the following is a specification.

This invention is a method consisting primarily in effecting an intimate combination between atmospheric air and a finely divided hygroscopic substance so that the moisture or watery vapor in the air will be absorbed by such substance.

In the preferred mode of operation such a hygroscopic substance as powdered lime capable of absorbing moisture is disseminated and floated in a current of atmospheric air, in such quantities, for such time and in such manner as may be required to effect the absorption of the moisture of the air to the extent desired.

In practice, for various uses, it is desirable to separate the lime with its absorbed moisture from the dried air and to this end the lime laden current of air may be carried through a filtering mechanism which separates the suspended matter from the desiccated air. It may also be desirable to circulate the air with the suspended desiccating agent in a chamber to effect the more thorough absorption of moisture and permit the suspended matter to either settle in the chamber or pass therefrom with the air. The air thus treated may be used in various manufacturing operations where desiccated air is desired, as in smelting iron, drying grain, and the like.

While it is the primary object of the invention to extract an impurity or foreign matter such as moisture from air by floating finely divided absorbent material therewith, it is to be understood that the removal of other impurities such as carbonic acid is contemplated and that the method is applicable to the removal of impurities from other gases.

The accompanying drawing represents a sectional side elevation of a plant which may be employed for the practice of the method as applied to blast furnaces.

The apparatus shown in the drawing comprises a hopper 1 for holding powdered lime which is carried by the feeding mechanism 2 through a sifter or screen 3 and delivered in disseminated form to a current of air flowing through the conduit 4. The air ladened with the powdered lime is carried from the conduit 4 into the circulating chamber 5 and thence through the conduit 6 into the circulating chamber 7, by which time and space are provided for permitting the lime to effect the absorption of the moisture from the air.

From the chamber 7 the now desiccated air may be discharged by the conduit 8 upwardly through the vessel 9 containing a body of coke or other suitable filtering material 10 and thence through the conduit 11 into the further vessel 12 containing a body of filtering material 13, the filters thus provided separating from the air its burned of lime with its absorbed moisture.

The air may be forced through the apparatus described by means of a compressor 14 discharging through a conduit 15 connected with the conduit 4, a nozzle 16 carrying the air from the conduit 15 into the conduit 4 to effect an ejector like action and suction for drawing the lime into the air current.

As applied to blast furnace use, the air from the filters would be carried by the conduit 17 through the stove 18 and thence through the conduit 19 to the blast pipe 20 and the twyers 21 into the furnace 22.

Various changes may be made in the character and arrangement of the apparatus employed without varying the essential features of the mode of operation, as, for example, in certain operations the filters may be omitted or so arranged as to permit a part of the suspended matter to pass therethrough with the air for further use.

As the amount of moisture to be absorbed and the quantity of lime necessary for its absorption can be readily determined, and as the whole body of the powdered lime disseminated through the air is active, the desiccating operation can be effected quickly scientifically or to a desired degree, and economically.

Having described our invention, we claim:—

1. The method of purifying air and other gas which consists in floating therein a finely divided absorbent substance in the quantity and for the time required to absorb the bulk of the impurity.

2. The method of desiccating air which consists in floating sufficient powdered lime therein to absorb the bulk of the moisture.

3. The method of desiccating air which consists in floating a finely divided hygroscopic material therein to remove the bulk of the moisture therefrom, and then filtering to separate the hygroscopic matter.

4. The method which consists in sifting a finely divided hygroscopic agent into a current of atmospheric air and circulating the air with its burden of hygroscopic material until such material has absorbed the bulk of the moisture from the air.

5. The method which consists of feeding powdered lime into a current of air containing moisture, circulating said air with its burden of lime in a suitable chamber or chambers until the lime has absorbed the bulk of the moisture from the air, and then passing the air through a suitable filter or filters to separate therefrom the lime with its absorbed moisture.

6. The method which consists in floating finely divided lime in a current of air and circulating the air with its burden of lime until such lime has absorbed the bulk of the moisture from the air.

In testimony whereof we have hereunto set our names this 30th day of June, 1906, in the presence of the subscribing witnesses.

PROSPER AUGUSTE MAIGNEN.
THERON I. CRANE.

Witnesses:
ROBERT JAMES EARLEY,
JOS. G. DENNY, Jr.